(12) United States Patent
Golov

(10) Patent No.: US 12,019,544 B2
(45) Date of Patent: *Jun. 25, 2024

(54) MEMORY MAPPING FOR HIBERNATION

(71) Applicant: Lodestar Licensing Group, LLC, Evanston, IL (US)

(72) Inventor: Gil Golov, Backnang (DE)

(73) Assignee: Lodestar Licensing Group LLC, Evanston, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/955,408

(22) Filed: Sep. 28, 2022

(65) Prior Publication Data
US 2023/0016888 A1    Jan. 19, 2023

Related U.S. Application Data

(63) Continuation of application No. 17/489,464, filed on Sep. 29, 2021, now Pat. No. 11,768,768, which is a
(Continued)

(51) Int. Cl.
| | |
|---|---|
| *G11C 11/16* | (2006.01) |
| *G05D 1/00* | (2006.01) |
| *G06F 9/4401* | (2018.01) |
| *G06F 11/07* | (2006.01) |
| *G06F 12/0804* | (2016.01) |
| *G11C 13/00* | (2006.01) |

(52) U.S. Cl.
CPC ....... *G06F 12/0804* (2013.01); *G05D 1/0212* (2013.01); *G06F 9/4418* (2013.01); *G06F 11/0727* (2013.01); *G06F 11/0751* (2013.01); *G06F 11/079* (2013.01); *G06F 11/0793* (2013.01); *G06F 2212/1032* (2013.01); *G06F 2212/205* (2013.01)

(58) Field of Classification Search
CPC .............. G11C 13/004; G11C 13/0026; G11C 13/0028; G11C 2013/0045; G11C 13/0061; G11C 11/1673; G11C 11/1693; G11C 2013/0057
See application file for complete search history.

(56) References Cited

U.S. PATENT DOCUMENTS

| | | |
|---|---|---|
| 6,192,469 B1 | 2/2001 | Smalley et al. |
| 8,161,306 B2 | 4/2012 | Reece et al. |

(Continued)

OTHER PUBLICATIONS

Title: Memory Mapping for Hibernation, U.S. Appl. No. 16/156,835, filed Oct. 10, 2018, Status Date: Oct. 7, 2020, Inventor: Gil Golov.
(Continued)

*Primary Examiner* — Hien N Nguyen
(74) *Attorney, Agent, or Firm* — Greenberg Traurig

(57) ABSTRACT

A computing system has a processing device (e.g., CPU, FPGA, or GPU) and memory regions (e.g., in a DRAM device) used by the processing device during normal operation. The computing system is configured to: monitor use of the memory regions in volatile memory; based on monitoring the use of the memory regions, identify at least one of the memory regions of the volatile memory; initiate a hibernation process; and during the hibernation process, copy data stored in the identified memory regions to non-volatile memory.

22 Claims, 6 Drawing Sheets

Related U.S. Application Data continuation of application No. 17/076,333, filed on Oct. 21, 2020, now Pat. No. 11,144,455, which is a continuation of application No. 16/156,835, filed on Oct. 10, 2018, now Pat. No. 10,817,423.

(56) References Cited

U.S. PATENT DOCUMENTS

| | | | |
|---|---|---|---|
| 10,817,423 B2* | 10/2020 | Golov | G06F 11/079 |
| 11,144,455 B2* | 10/2021 | Golov | G06F 12/0246 |
| 2002/0087816 A1 | 7/2002 | Atkinson et al. | |
| 2007/0150760 A1 | 6/2007 | Nowlin | |
| 2007/0277051 A1 | 11/2007 | Reece | |
| 2007/0294490 A1 | 12/2007 | Freitas et al. | |
| 2009/0172439 A1 | 7/2009 | Cooper et al. | |
| 2010/0268869 A1 | 10/2010 | Roh et al. | |
| 2012/0011312 A1 | 1/2012 | Dorfman et al. | |
| 2013/0042095 A1 | 2/2013 | Jung | |
| 2013/0290760 A1 | 10/2013 | Cooper et al. | |
| 2014/0181558 A1 | 6/2014 | Taha et al. | |
| 2014/0281458 A1 | 9/2014 | Ravimohan et al. | |
| 2015/0026497 A1 | 1/2015 | Okuda | |
| 2017/0031833 A1 | 2/2017 | Atkinson | |
| 2017/0147363 A1 | 5/2017 | Sun et al. | |
| 2018/0203622 A1 | 7/2018 | Ishiguro | |
| 2020/0117599 A1 | 4/2020 | Golov | |
| 2020/0142472 A1 | 5/2020 | Golov | |
| 2020/0151067 A1 | 5/2020 | Golov | |
| 2020/0174677 A1 | 6/2020 | Golov | |
| 2021/0056022 A1 | 2/2021 | Golov | |
| 2022/0019532 A1 | 1/2022 | Golov | |
| 2023/0016888 A1* | 1/2023 | Golov | G06F 11/0793 |

OTHER PUBLICATIONS

Title: Memory Mapping for Hibernation, U.S. Appl. No. 17/076,333, filed Oct. 21, 2020, Status Date: Sep. 22, 2021, Inventor: Gil Golov.
Title: Memory Mapping for Hibernation, U.S. Appl. No. 17/489,464, filed Sep. 29, 2001, Status Date: Oct. 22, 2022, Inventor: Gil Golov.

* cited by examiner

MEMORY MAPPING FOR HIBERNATION

RELATED APPLICATIONS

The present application is a continuation application of U.S. patent application Ser. No. 17/489,464, filed Sep. 29, 2021, which is a continuation application of U.S. patent application Ser. No. 17/076,333, filed Oct. 21, 2020, issued as U.S. Pat. No. 11,144,455 on Oct. 12, 2021, which is a continuation application of U.S. patent application Ser. No. 16/156,835, filed Oct. 10, 2018, issued as U.S. Pat. No. 10,817,423 on Oct. 27, 2020, both entitled "Memory Mapping for Hibernation", the entire disclosures of which applications are hereby incorporated herein by reference.

FIELD OF THE TECHNOLOGY

At least some embodiments disclosed herein relate to memory systems in general, and more particularly, memory mapping used for hibernation in a computing system.

BACKGROUND

Hibernation for computing systems is, for example, the powering down of a computer while retaining its state. After entering hibernation, the computer saves the contents of its random access memory (RAM) to a hard disk or other non-volatile storage. When resuming operation, the computer is in the same state as it was before entering hibernation.

After hibernating, the hardware can be powered down similar to a regular shutdown of the computer. Hibernation is one way of avoiding the need to save unsaved data before shutting down, and then restoring all running programs after powering up the computer again. Hibernation can be used, for example, in laptops, which have limited battery power available. In some cases, hibernation can be triggered automatically based on a low battery alarm. Many desktop computers support hibernation as an energy saving feature.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
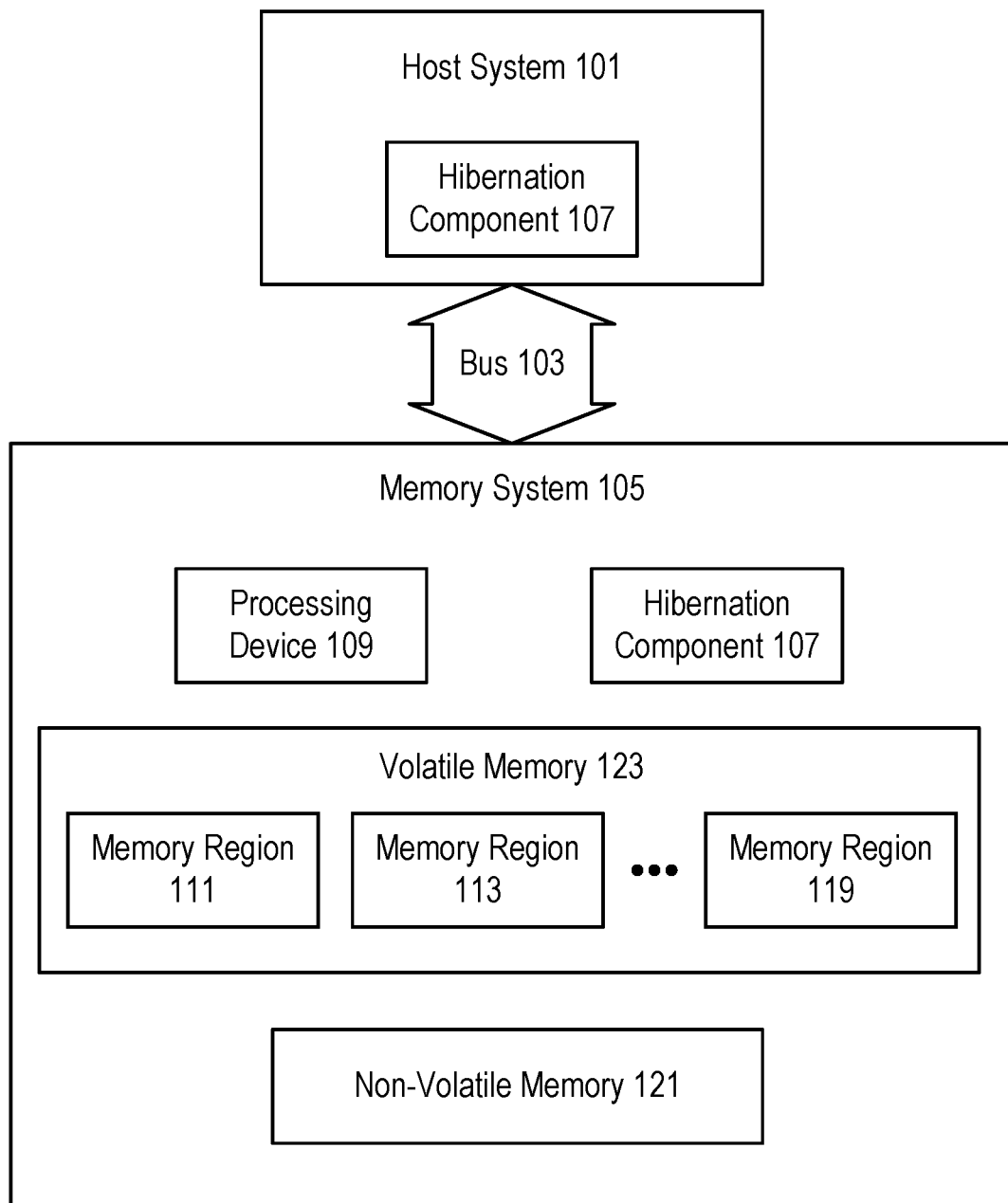
FIG. 1 illustrates an example computing system having a hibernation component, in accordance with some embodiments of the present disclosure.

At least some aspects of the present disclosure are directed to identifying memory regions of a volatile memory that are to be saved when performing a hibernation process.

Hibernation enables a computer to power down yet retain its states (e.g., the states of software processes executing on the computer). When powering down, the contents of volatile memory (e.g., RAM) is copied to a non-volatile memory (e.g., a solid-state drive (SSD)). When powering up, the saved data content is copied back from the non-volatile memory to the volatile memory. As a result, the computer continues to operate exactly from the point as it was operating before hibernating.

It has been recognized that several technical problems can exist due to hibernation. For example, hibernation can consume significant power if large quantities of data need to be copied. Also, copying large quantities of data can be time consuming. Further, saving large quantities of data to non-volatile memory can significantly increase the size and cost of the non-volatile memory. Finally, saving large quantities of data slows down booting of the computer when the computer is being restored after hibernation.

At least some aspects of the present disclosure address the above and other deficiencies by having, for example, software and/or an operating system (OS) build and track a dynamic memory map. The memory map includes different memory regions that correspond to a volatile memory. The memory map is used to identify memory regions that are to be saved when hibernation occurs.

In one embodiment, each region of the memory map is flagged as a critical region for hibernating, or marked as a non-critical region for hibernating. In some cases, only the critical regions are flagged. When a hibernating process starts, the memory map is used to identify the critical data regions that need to be copied to the non-volatile memory during the hibernating process. The memory map further can identify other non-critical regions of the memory that are not necessarily required to be copied.

Examples of critical memory regions to be stored during hibernating include data associated with the operating system, software, software stacks, program variables, etc. Some of this data such as program variables is generated at run-time by one or more software processes executing on one or more processing devices.

Examples of non-critical memory regions include regions storing data for graphics video buffers, camera input buffers, artificial graphics, deep learning temporary calculations, etc. Such data is typically generated at run-time by one or more software processes during normal operations of the computer.

Thus, various embodiments of the present disclosure provide a hibernation component that reduces the amount of data that is copied to and from the non-volatile memory and provides several advantages. For example, the hibernation component can reduce the required non-volatile memory size and cost, and reduce the hibernating time. The hibernation component also can reduce the energy that is used during the hibernating process. This can be an advantage when the computing system is being operated on backup power or batteries.

The hibernation component of the present disclosure can be implemented in various computing systems. In one example system, a processing device (e.g., a system-on-chip (SOC), FPGA, CPU, or GPU) stores run-time data in a volatile memory device(s) (e.g., a DRAM device). The hibernation component copies identified data from the volatile memory to non-volatile memory (e.g., cross point memory (such as 3DXP memory) or a SSD).

FIG. 1 illustrates an example computing system having a hibernation component 107, in accordance with some embodiments of the present disclosure. A host system 101 communicates over a bus 103 with a memory system 105. A processing device 109 of memory system 105 has read/write access to memory regions 111, 113, . . . , 119 of volatile memory 123. In one example, host system 101 reads data from and writes data to volatile memory 123.

In one example, the processing device 109 and the memory regions 111, 113, . . . , 119 are on the same chip or die. In some embodiments, the memory regions store data used by the host system 101 and/or the processing device 109 during machine learning processing or other run-time data generated by software process(es) executing on host system 101 or on processing device 109.

The computing system includes a hibernation component 107 in the memory system 105 that can copy identified memory regions of the memory system 105. The computing system 100 can further include a hibernation component 107 in the host system 120 that coordinates with the hibernation component 107 in the memory system 105 to at least facilitate hibernation including copying of identified memory regions.

In various embodiments, the hibernation component 107 copies identified memory regions of volatile memory 123 to non-volatile memory 121. For example, a hibernation process can flag memory region 111 and memory region 119 as being critical to save during hibernation, such that data in the memory regions will be copied during hibernation. The memory region 113 may be marked as non-critical or not marked. If not marked, then the memory region 113 is not copied during hibernation. If marked as non-critical, the memory region 113 may be copied to non-volatile memory 121 after critical memory regions are first copied.

In some embodiments, host system 101 can generate a memory map that stores data regarding the identification of memory regions in volatile memory 123. In one example, volatile memory 123 is used as system memory for a processing device (not shown) of host system 101. In one embodiment, a process of host system 101 identifies memory regions by monitoring how the memory regions are used (e.g., used by software processes). For example, the host system 101 can identify memory regions based on the context of memory allocation requests received from one or more software processes.

In some embodiments, processing device 109 includes at least a portion of the hibernation component 107. In other embodiments, or in combination, the processing device 109 and/or a processing device in the host system 101 includes at least a portion of the hibernation component 107. For example, processing device 109 and/or a processing device of the host system 101 can include logic circuitry implementing the hibernation component 107. For example, a controller or processing device (processor) of the host system 101, can be configured to execute instructions stored in memory for performing the operations of the hibernation component 107 described herein.

In some embodiments, the hibernation component 107 is implemented in an integrated circuit chip disposed in the memory system 105. In other embodiments, the hibernation component 107 in the host system 120 is part of an operating system of the host system 120, a device driver, or an application.

An example of memory system 105 is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory system can be a hybrid memory/storage system that provides both memory functions and storage functions. In general, a host system can utilize a memory system that includes one or more memory regions. The host system can provide data to be stored at the memory system and can request data to be retrieved from the memory system. In one example, a host can access various types of memory, including volatile and non-volatile memory.

The host system 101 can be a computing device such as a controller in a vehicle, a network server, a mobile device, a cellular telephone, an embedded system (e.g., an embedded system having a system-on-chip (SOC) and internal or external memory), or any computing device that includes a memory and a processing device. The host system 101 can include or be coupled to the memory system 105 so that the host system 101 can read data from or write data to the memory system 105. The host system 101 can be coupled to the memory system 105 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 101 and the memory system 105. The physical host interface can provide an interface for passing control, address, data, and other signals between the memory system 105 and the host system 101. FIG. 1 illustrates a memory system 105 as an example. In general, the host system 101 can access multiple memory systems via a same communication connection, multiple separate communication connections, and/or a combination of communication connections.

The host system 101 can include a processing device and a controller. The processing device of the host system 101 can be, for example, a microprocessor, a central processing unit (CPU), a processing core of a processor, an execution unit, etc. In some instances, the controller of the host system can be referred to as a memory controller, a memory management unit, and/or an initiator. In one example, the controller controls the communications over bus 103 between the host system 101 and the memory system 105.

A controller of the host system 101 can communicate with a controller of the memory system 105 to perform operations such as reading data, writing data, or erasing data at the memory regions of volatile memory 123. In some instances, the controller is integrated within the same package of the processing device 109. In other instances, the controller is separate from the package of the processing device 109. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

In one embodiment, the memory regions 111, 113, . . . , 119 can include any combination of different types of volatile memory components. In some embodiments, the memory regions can be, but are not limited to, random access memory (RAM), dynamic random access memory (DRAM), and synchronous dynamic random access memory (SDRAM). Furthermore, the memory cells of the memory regions can be grouped as memory pages or data blocks that can refer to a unit used to store data. In some embodiments, the memory map can flag memory pages or data blocks to indicate copying is to be done during hibernation.

In one embodiment using hibernation component 107, one or more controllers of the memory system 105 can communicate with the memory regions 111, 113, . . . , 119 to perform operations such as reading data, writing data, or erasing data. Each controller can include hardware such as one or more integrated circuits and/or discrete components, a buffer memory, or a combination thereof. Each controller can be a microcontroller, special purpose logic circuitry (e.g., a field programmable gate array (FPGA), an application specific integrated circuit (ASIC), etc.), or another suitable processor. The controller(s) can include a processing device (processor) configured to execute instructions stored in local memory. In one example, local memory of the controller includes an embedded memory configured to store instructions for performing various processes, operations, logic flows, and routines that control operation of the memory system 105, including handling communications between the memory system 105 and the host system 101. In some embodiments, the local memory can include memory registers storing memory pointers, fetched data, etc. The local memory can also include read-only memory (ROM) for storing micro-code.

In general, controller(s) of memory system 105 can receive commands or operations from the host system 101 and/or processing device 109 and can convert the commands or operations into instructions or appropriate commands to achieve the hibernation for the identified memory regions. The controller can also be responsible for other operations such as wear leveling operations, garbage collection operations, error detection and error-correcting code (ECC) operations, encryption operations, caching operations, and address translations between a logical block address and a physical block address that are associated with the memory regions. The controller can further include host interface circuitry to communicate with the host system 101 via the physical host interface. The host interface circuitry can convert the commands received from the host system into command instructions to access one or more of the memory regions as well as convert responses associated with the memory regions into information for the host system 101.

The memory system 105 can also include additional circuitry or components that are not illustrated. In some embodiments, the memory system 105 can include a cache or buffer (e.g., DRAM or SRAM) and address circuitry (e.g., a row decoder and a column decoder) that can receive an address from one or more controllers and decode the address to access the memory regions.

In some embodiments, a controller in the host system 101 or memory system 105, and/or the processing device 109 includes at least a portion of the hibernation component 107. For example, the controller and/or the processing device 109 can include logic circuitry implementing the hibernation component 107. For example, a processing device (processor) can be configured to execute instructions stored in memory for performing operations that provide read/write access to memory regions for the hibernation component 107 as described herein. In some embodiments, the hibernation component 107 is part of an operating system, a device driver, or an application.

Figure 2:
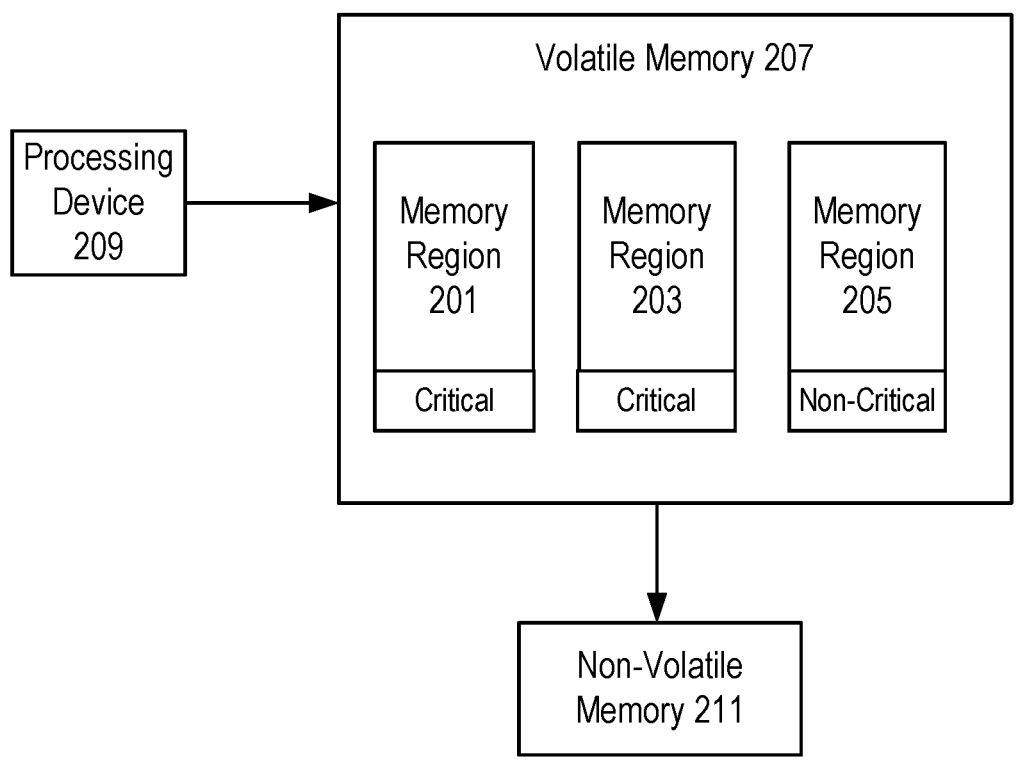
FIG. 2 illustrates an example memory system that identifies critical memory regions for hibernation, in accordance with some embodiments of the present disclosure.

FIG. 2 illustrates an example memory system that identifies critical memory regions (e.g., memory regions 201, 203 of volatile memory 207) for copying during a hibernation process, in accordance with some embodiments of the present disclosure. In contrast to memory regions 201 and 203, memory region 205, for example, is identified as being non-critical as regards the hibernation process.

Volatile memory 207 is an example of volatile memory 123. In one example, processing device 209 can be in host system 101 or memory system 105. Non-volatile memory 211 is an example of non-volatile memory 121. In one example, non-volatile memory 211 is flash memory and/or a solid-state drive (SSD).

In one embodiment, system memory used by processing device 209 resides in volatile memory 207. Processing device 209 can initiate a hibernation process in response to various events (e.g., a detection of a loss of power to a memory or other component of the computing system). Copying of data from identified critical regions of volatile memory 207 is performed before copying of any other data, or alternatively no other data is copied. The copying can be handled under control of processing device 209, and/or processing device 209 can hand over control to a direct memory access controller (not shown) for copying of some or all of the memory regions to non-volatile memory 211.

In one embodiment, a host system (e.g., host system 101) can collect data from sensors of an embedded system. For example, the sensors can be located on an autonomous vehicle and collect image data used for navigation of the vehicle. In one embodiment, the sensor data is input to a neural network and an output is used to control the vehicle. In one embodiment, the processing associated with a neural network is performed by processing device 209, either alone or in conjunction with a processing device of the host system. Data generated during this processing can be identified as being stored in one or more critical memory regions for copying during the hibernation process.

In one embodiment, a neural network is trained or operated using processing device 209. During training or other operation of the neural network, data is read and written to and from volatile memory 207. Data associated with the neural network can be flagged as critical, non-critical, or not flagged.

In one embodiment, the processing device 209 and the volatile memory 207 are disposed on the same chip or die, and the processing device 209 uses stored data from volatile memory as an input to a computer model for machine learning. In one embodiment, the computer model is a neural network. In one embodiment, the processing device 209 provides data as an output from the computer model.

In one embodiment, controller(s) used to access volatile memory 207 can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or another suitable processor. The controller can include one or more processors (processing devices) configured to execute instructions stored in local memory.

Local memory of the controller can include an embedded memory configured to store instructions for performing various processes, operations, logic flows, and routines that control aspects of operation for the memory system. Local memory of the controller can include read-only memory (ROM) for storing micro-code and/or memory registers storing, for example, memory pointers, fetched data, etc.

Figure 3:
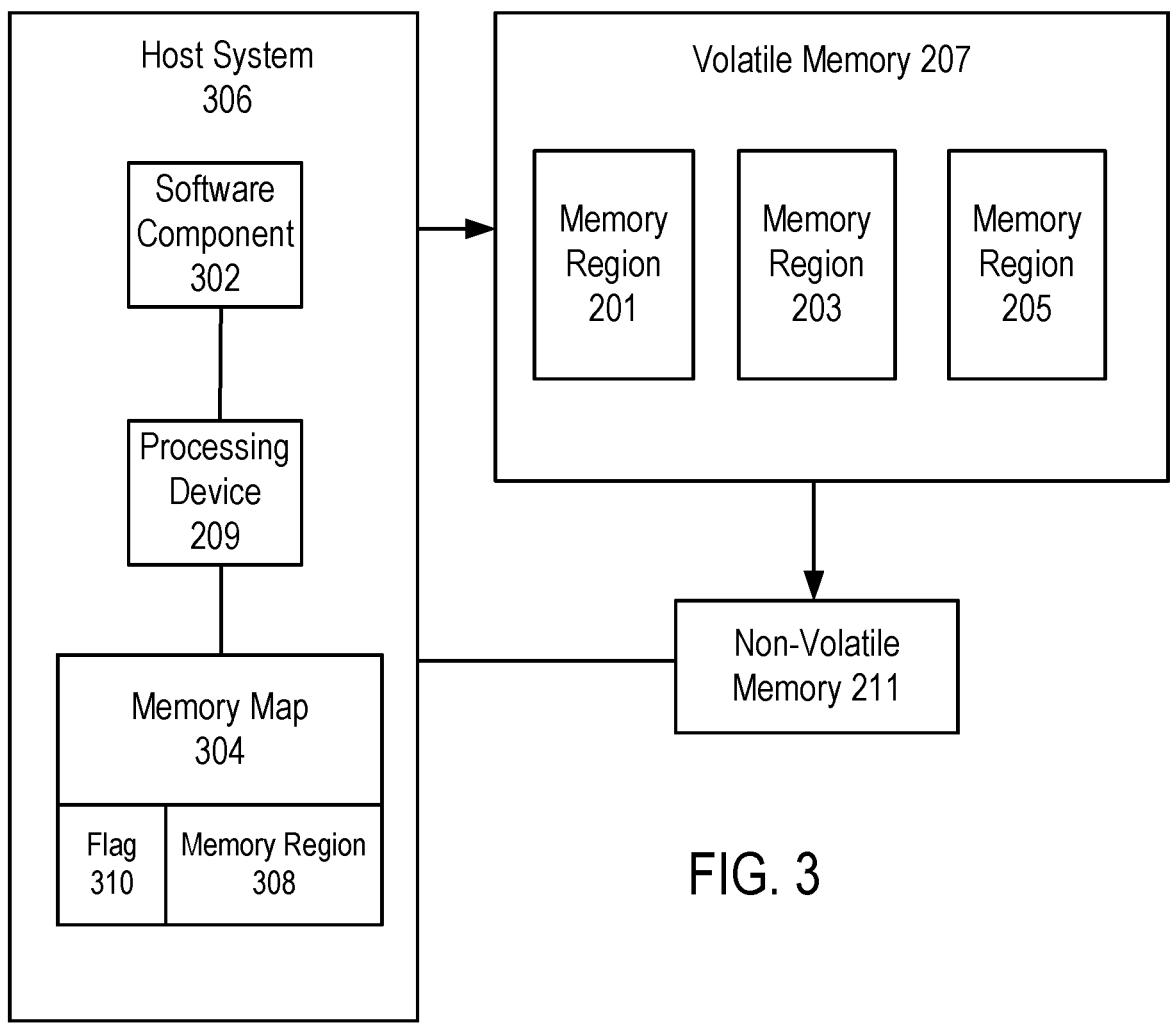
FIG. 3 illustrates an example computing system having a host system that stores critical run-time data in a volatile memory prior to a hibernation process, in accordance with some embodiments of the present disclosure.

FIG. 3 illustrates an example computing system having a host system 306 that stores critical run-time data in volatile memory 207 prior to a hibernation process, in accordance with some embodiments of the present disclosure. After a hibernation process is initiated, data in identified memory regions is copied from volatile memory 207 to non-volatile memory 211. In one example, host system 306 controls volatile memory 207 and/or non-volatile memory 211 during the hibernation process.

Host system 306 includes processing device 209, which is executing a software component 302. Processing device 209 maintains a memory map 304. Memory map 304 contains records for each of several memory regions in volatile memory 207. For example, one such record corresponds to a memory region 308 of volatile memory 207 and is identified by a flag 310. Flag 310 in one example indicates that memory region 308 is critical. In one example, additional records exist in memory map 304 for one or more of memory regions 201, 203, 205. More than one type of flag can be used in various embodiments. For example one type of flag can indicate a critical memory region, while another type of flag can indicate a non-critical memory region and/or other context or characterization data associated with the memory region.

After the computing system has hibernated, normal operation can be restored by copying data from non-volatile memory 211 to corresponding memory regions in volatile memory 201. In one example, after normal operation is restored, all flags in memory map 304 can be cleared. In another example, the state of flags in memory map 304 can remain unchanged from their values prior to initiation of hibernation.

In one example, memory map 304 is a data structure (e.g., a table) that indicates how memory is used. In some cases, the memory map can indicate a correspondence between a virtual memory structure (e.g., as used by a process of a software component executing on processing device 209) and physical memory addresses of the memory. In some cases, this correspondence between virtual memory structure and physical memory addresses is maintained and managed by a memory management unit (MMU). In one example, the MMU resides in a host system (e.g., host system 101) that communicates with a memory system (e.g., memory system 105).

Figure 4:
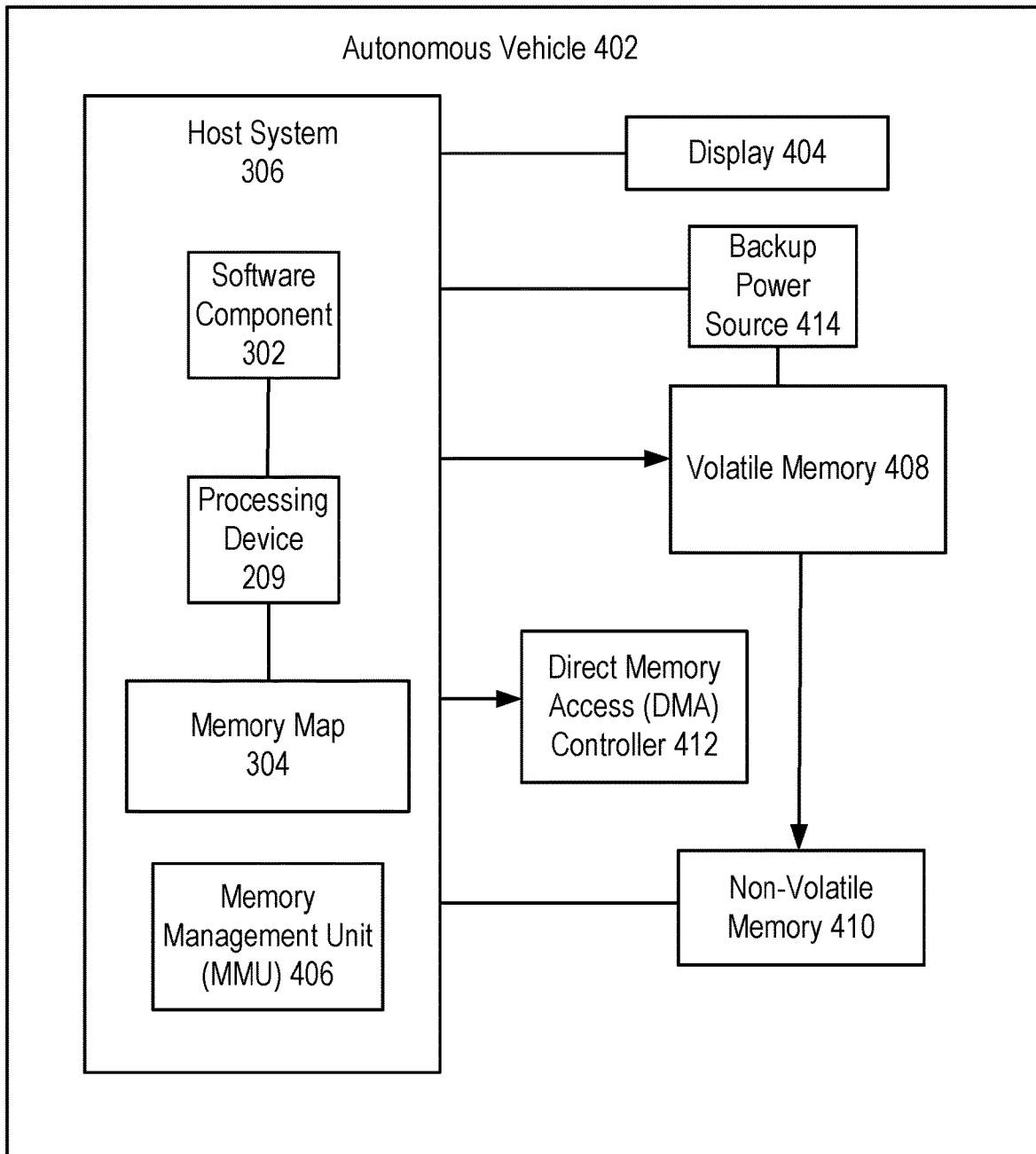
FIG. 4 illustrates an example autonomous vehicle having a volatile memory that stores critical run-time data generated by a software component of a host system prior to hibernation, in accordance with some embodiments of the present disclosure.

FIG. 4 illustrates an example autonomous vehicle 402 having a volatile memory 408 that stores critical run-time data generated by software component 302 of host system 306 prior to hibernation, in accordance with some embodiments of the present disclosure. Volatile memory 408 is an example of volatile memory 123 or volatile memory 207. During a hibernation process, data is copied from volatile memory 408 to non-volatile memory 410.

In one embodiment, processing device 209 initiates the hibernation process. After initiating the hibernation process, processing device 209 sends a signal to direct memory access controller 412. In response to receiving the signal, DMA controller 412 takes over copying of some or all data in the identified memory regions from volatile memory 408 to non-volatile memory 410. DMA controller 412 has access to memory map 304. In one example, data from memory map 304 is sent to DMA controller 412 for use in the copying during the hibernation process.

In one example, the use of DMA controller 412 enables certain hardware subsystems to access main system memory (e.g., RAM) independently of a central processing unit (CPU). In one example, DMA controller can also be used for memory to memory copying or moving of data within memory. In one example, the DMA controller offloads memory operations from the CPU. For example, the CPU can initialize the DMA controller (e.g., with a count of the number of words to transfer, and the starting memory address to use). The DMA controller can increment an internal address register until, for example, a full block of data is transferred.

In one example, DMA controller 412 is used to copy data from volatile memory 408 to non-volatile memory 410. Host system 306 sends a signal to DMA controller 412 that initiates handling of the copying by DMA controller 412. In addition to the signal, the host system 306 can communicate data from memory map 304 that indicates identified memory regions of volatile memory 408 to be copied. The memory regions can be identified, for example, by providing physical addresses from the host system 306 to the DMA controller 412.

In some cases, DMA controller 412 can be incorporated in processing device 209. In other cases, DMA controller 412 is a separate component.

In one embodiment, after DMA controller 412 is set up to handle the copying, power to processing device 209 and/or host system 306 can be shut off to save energy. In one embodiment, copying of identified memory regions by the DMA can be delayed. For example, delaying the DMA operation is possible if a portion of DRAM is still powered up during the initial hibernation. To shut down this portion of DRAM (e.g., when the hibernation is long or expected to be long), DMA operations are executed. From the user's point of view, the computing system is already in hibernation while the DMA copying operation is running. The user does not have to wait (e.g., no further response is required from the user to complete the hibernation process).

Host system includes a memory management unit 406. In some embodiments, MMU 406 allocates memory regions of volatile memory 408. When allocating a memory region, MMU 406 can store a flag in memory map 304 that indicates an identification type associated with the memory region of volatile memory 408. In one example, the identification type indicates the memory region as being critical.

In one embodiment, the identification of critical/non-critical data may be based on a memory allocation procedure. For example, one routine can be used to request memory for storing critical data; and another routine can be used to request memory for storing non-critical data. Thus, the computing system (e.g., host system 306) knows which memory content needs to be backed up to non-volatile memory (e.g., SSD), and which can be discarded. Alternatively, when a memory allocation is requested, the requester can specify a characterization of the memory (e.g., one category selected from a plurality of categories, such as video data, disposable data, input buffer, output buffer, etc.). The computing system can be customized to selectively classify a set of categories as non-critical. The non-critical data may be discarded or not backed up during hibernation.

In one example, there is a trade-off between going to hibernation faster, and waking up faster. If more data is discarded/corrupted, it will take a longer time for the system to wake up, but less time for going into hibernation.

In one embodiment, host system 306 provides data for displaying graphical images on display 404 for a user of autonomous vehicle 402. Memory regions storing data corresponding to the presented display can be identified as being critical. In one case, vehicle 402 is shut down by the user. Host system 306 initiates the hibernation process in response to this user shutdown. During the hibernation process, data corresponding to the presented display is copied to non-volatile memory 410 due to being marked as critical.

In one embodiment, a backup power source 414 is used to provide backup power to volatile memory 408. Host system 306 is configured to detect an impending loss of power from backup power source 414. In response to detecting the impending loss of power, host system 306 can initiate a hibernation process by which data stored in identified memory regions of volatile memory 408 is copied to non-volatile memory 410.

In one example, from a hardware point of view, a portion of RAM (e.g., volatile memory 408) may be power-backed. This portion can be allocated as critical data. Backing up this portion of RAM to a SSD can be delayed or eliminated, based on power management. For example, this part of RAM can be backed up when the battery power is below a threshold, or the computing system has been in hibernation for more than a threshold period of time. Also, a prediction of the hibernation time (e.g., based on past usage and/or an artificial neural network (ANN) model) can be used to determine whether or not to back up this critical data. Power management regarding hibernation can have different levels: discarding the non-critical data and cutting the power to the non-critical RAM, setting up for DMA operation for background backing up of critical data, and/or delaying DMA operations until it is determined that the hibernation is long (e.g., exceeds a predetermined time period) or expected to be long.

Figure 5:
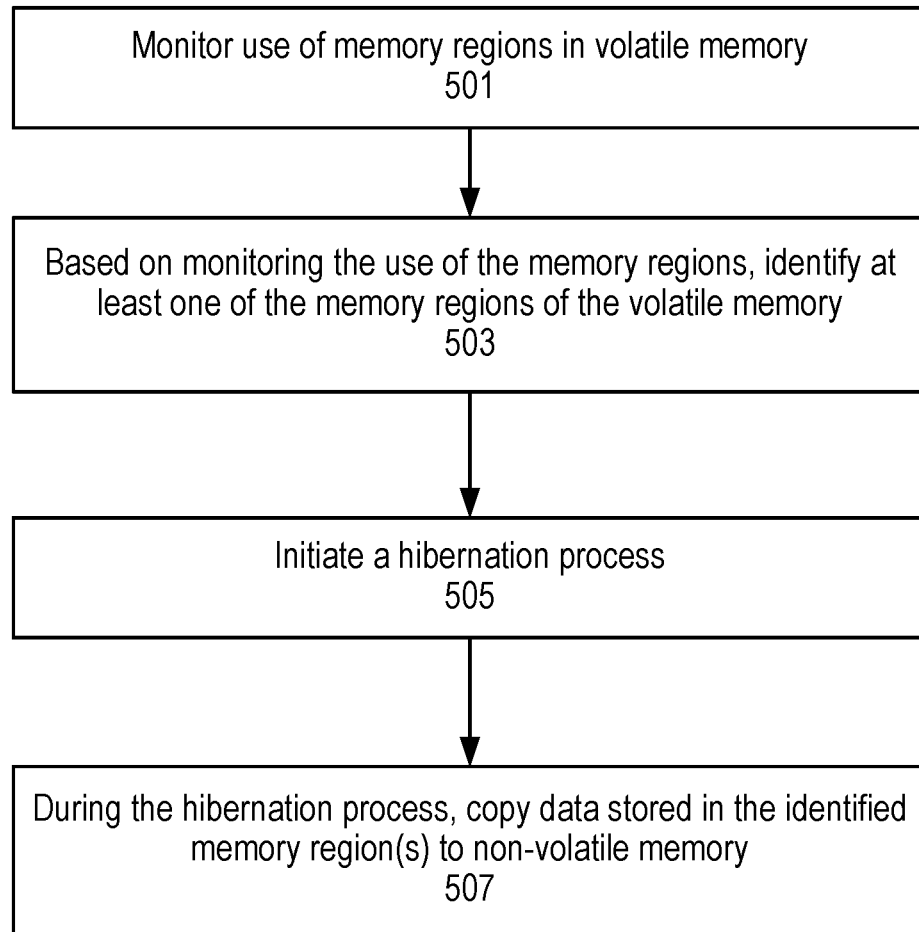
FIG. 5 is a flow diagram of an example method of memory mapping for hibernation, in accordance with some embodiments of the present disclosure.

FIG. 5 is a flow diagram of an example method of memory mapping for hibernation, in accordance with some embodiments of the present disclosure. For example, the method of FIG. 5 can be implemented in the system of FIGS. 1-4.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by the hibernation component 107 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, the use of memory regions in volatile memory is monitored. For example, memory regions 201, 203, 205 of volatile memory 207 are monitored by a process executing on processing device 209. In another example, MMU 406 monitors memory allocation requests and associates these requests with memory regions.

At block 503, based on monitoring the use of the memory regions, at least one of the memory regions of the volatile memory is identified. For example, memory map 304 identifies memory region 308 using flag 310.

At block 505, a hibernation process is initiated. For example, host system 306 can detect an impending loss of power provided by backup power source 414. In another example, host system 306 initiates a hibernation process in response to a user shutting down power to a computing system.

At block 507, during the hibernation process, data stored in the identified memory region(s) is copied to non-volatile memory. For example, DMA controller 412 copies data in identified memory regions of volatile memory 408 to non-volatile memory 410.

In one aspect, the present disclosure includes computing apparatuses performing any of the methods and non-transitory computer-readable storage media storing instructions that, when executed by a processing device, cause the processing device to perform any of the methods.

In one embodiment, a method comprises: identifying at least one first region of memory regions (e.g., memory regions 201, 203) in volatile memory, wherein the identified at least one first region is to be saved during a hibernation process; initiating the hibernation process; and during the hibernation process, copying first data stored in the identified at least one first region to non-volatile memory (e.g., non-volatile memory 211).

In one embodiment, identifying at least one first region of the memory regions is performed by updating a memory map (e.g., memory map 304) associated with the volatile memory.

In one embodiment, the method further comprises: starting a new process on a processing device, the new process associated with software that controls a vehicle system of an autonomous vehicle; and identifying, in response to starting the new process, a second memory region (e.g., memory region 201 or 308) to save during the hibernation process, the second memory region allocated to store run-time data generated during execution of the new process; wherein the memory map is updated to indicate the second memory region as critical for hibernation.

In one embodiment, a software component executing on a processing device of an autonomous vehicle identifies the at least one first region of the memory regions, and the software component updates a memory map to store a flag associated with the identified at least one first region, the flag indicating the at least one first region as critical for hibernation.

In one embodiment, at least one process executing on a processing device of an autonomous vehicle is in a first state when the hibernation process is initiated, the method further comprising restoring the first data from the non-volatile memory to the volatile memory such that the at least one process is restored to the first state.

In one embodiment, the at least one process generates at least one graphical image for presentation on a display (e.g., display 404) to a user of the autonomous vehicle, and wherein the first state includes data associated with the at least one graphical image as presented on the display at the time that the user initiates a shut down of the vehicle.

In one embodiment, the method further comprises: initiating, by a processing device of a host system, execution of a first software component; in response to initiating the execution of the first software component, allocating, by a memory management unit of the host system, a second memory region of the volatile memory for use by the first software component to store second data; determining, by the memory management unit, that the second memory region is to be saved during the hibernation process; updating, by the memory management unit, a memory map to indicate the second memory region as critical for hibernation; and during the hibernation process, copying the second data stored in the second memory region to the non-volatile memory.

In one embodiment, identifying the at least one first region is performed in response to receiving a memory characterization from an application executing on a processing device, the application to use the at least one first region during execution.

In one embodiment, the volatile memory stores system memory used by a processing device when executing one or more applications, and the first data resides in the system memory, the method further comprising: in response to initiating the hibernation process, instructing, by the processing device, a direct memory access controller to copy the first data to the non-volatile memory; and after instructing the direct memory access controller to copy the first data, shutting off power to the processing device; wherein, after shutting off the power to the processing device, the direct memory access controller completes copying of the first data to the non-volatile memory.

In one embodiment, second data stored in the volatile memory is supported by a first backup power source, and the first data is not supported by a backup power source, the method further comprising: during the hibernation process, copying the second data to the non-volatile memory, wherein the second data is copied after the first data is fully copied to the non-volatile memory.

In one embodiment, the second data is copied to the non-volatile memory after determining an impending failure of the first backup power source.

In one embodiment, a non-transitory computer-readable storage medium stores instructions that, when executed by a processing device, cause the processing device to perform a method, the method comprising: identifying at least one first region of memory regions in volatile memory, wherein the identified at least one first region is to be saved during a hibernation process; initiating the hibernation process; and during the hibernation process, copying first data stored in the identified at least one first region to non-volatile memory.

In one embodiment, a system comprises: at least one processing device; and memory storing instructions configured to instruct the at least one processing device to: monitor use of memory regions in volatile memory; based on monitoring the use of the memory regions, identify at least one of the memory regions of the volatile memory; initiate a hibernation process; and during the hibernation process, copy data stored in the identified memory regions to non-volatile memory.

In one embodiment, identifying the at least one of the memory regions includes associating a flag with each of the memory regions, the flag identifying the respective memory region as critical for hibernation.

In one embodiment, the flag is a first flag, the identified memory regions are first memory regions, and the instructions are further configured to instruct the at least one processing device to associate a second flag with each of at least one second memory region of the volatile memory, the second flag identifying each of the at least one second memory region as non-critical for hibernation.

In one embodiment, the instructions are further configured to instruct the at least one processing device to, during the hibernation process, copy data stored in the second memory regions to the non-volatile memory, wherein the data stored in the second memory regions is copied to the non-volatile memory after copying the data stored in the first memory regions to the non-volatile memory.

In one embodiment, the at least one processing device controls navigation of an autonomous vehicle by executing software, and wherein the identified memory regions store run-time data for the software.

In one embodiment, software is executing on the at least one processing device prior to initiating the hibernation process, and the identified memory regions store run-time data generated during execution of the software.

In one embodiment, the instructions are further configured to instruct the at least one processing device to: receive a request from a first process for a memory allocation, the memory allocation associated with a first memory region of the volatile memory, and the request including a memory characterization indicating that data stored in the first memory region is critical for hibernation; use the first memory region to store first data, wherein the first data is generated during execution of the first process; based on using the first memory region to store the first data, identify the first data as critical for hibernation; and during the hibernation process, copy the first data to the non-volatile memory.

In one embodiment, the hibernation process is initiated in response to detection of an impending power loss to the volatile memory.

In one example, when a computer is placed in a hibernation mode, the computer may turn off the power to DRAM to save power, and/or cut the power to the CPU to avoid running out of battery power and failing to come back on when trying to restore the system.

In one embodiment, some RAM contents can be regenerated (and thus do not need to be saved during hibernation) when the operating system and applications are loaded back to the memory and again running. The software of the operating system and/or the applications in the memory may also have a copy of corresponding data (e.g., application code) in the hard drive already. Thus, indications of which portions of the stored software on the hard drive corresponding to which code segment in the memory can be stored to avoid storing the software (e.g. these indications also can be stored in memory map 304).

Some run-time data (e.g., data in memory dynamically allocated for an application or program) are critical. If such data is corrupted, the application/program may not be able to recover (i.e., may have to be restarted). This data can be identified as critical in a memory map or by other means.

In some other instances, restarting such application or program may not be of concern. Thus, these applications/programs can be identified as non-critical and not backed up (e.g., in a SSD). However, other data (e.g., critical or another identified type of data) can be copied to the SSD.

Figure 6:
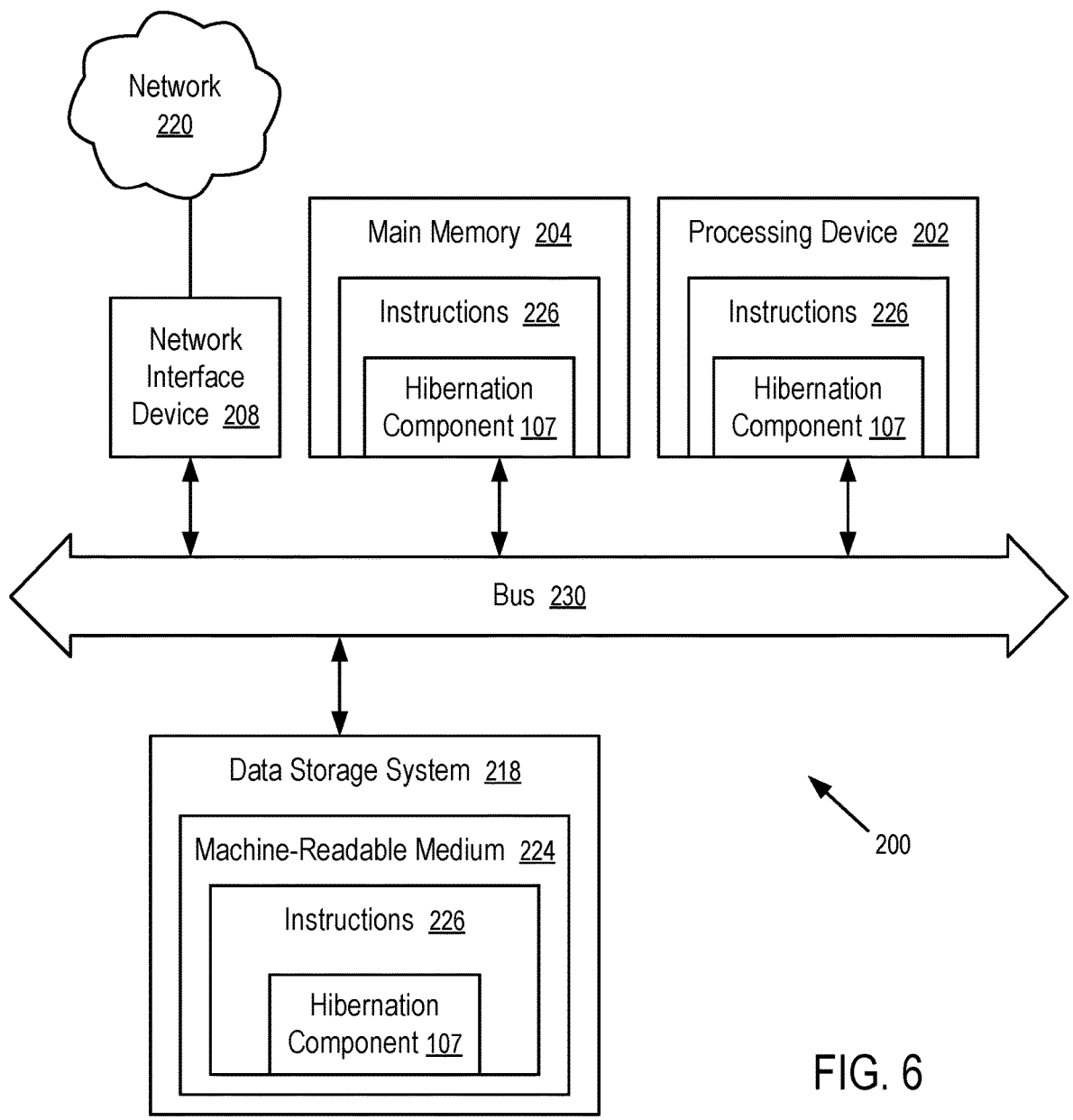
FIG. 6 is a block diagram of an example computer system in which embodiments of the present disclosure can operate.

FIG. 6 is a block diagram of an example computer system 200 in which embodiments of the present disclosure can operate. In one embodiment, in computer system 200 a set of instructions, for causing a machine to perform any one or more of the methodologies discussed herein, can be executed. In some embodiments, the computer system 200 can correspond to a memory system, or to a host system that includes, is coupled to, or utilizes a memory system (e.g., the memory system 105 of FIG. 1) or can be used to perform the operations of a hibernation component 107 (e.g., to execute instructions to perform operations corresponding to the hibernation component 107 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable storage medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable storage medium 224, data storage system 218, and/or main memory 204 can correspond to the memory system 105 of FIG. 1.

In one embodiment, the instructions 226 include instructions to implement functionality corresponding to a hibernation component 107 (e.g., the hibernation component 107 described with reference to FIGS. 1-5). While the machine-readable storage medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   at least one volatile memory;
   at least one non-volatile memory configured to store data copied from the volatile memory; and
   at least one processing device configured to:
      store data in the volatile memory when in an active mode;
      in response to receiving a first signal when in active mode, copy the data from the volatile memory to the non-volatile memory; and
      after copying the system memory, enter a hibernation mode.

2. The system of claim 1, wherein the data comprises system memory, stored in a first region of a plurality of memory regions of the volatile memory.

3. The system of claim 1, wherein the first signal is received from a computing device.

4. The system of claim 1, wherein the processing device is configured in a vehicle.

5. The system of claim 1, further comprising a direct memory access (DMA) controller, wherein the data is copied from the volatile memory to the non-volatile memory by the DMA controller.

6. The system of claim 1, wherein the data is flagged prior to entering the hibernation mode.

7. The system of claim 2, wherein a first portion of the system memory is flagged; and when copying the system memory from the volatile memory to the non-volatile memory, the first portion has a higher priority for copying than other portions of the system memory.

8. The system of claim 1, wherein the first signal is an instruction to initiate a hibernation process.

9. The system of claim 8, wherein the first signal is generated by software executing on a host system.

10. The system of claim 8, wherein the instruction is sent by a computing device.

11. The system of claim 1, wherein the processing device is configured in a computing system, and a second signal is sent to wake up the computing system from hibernation.

12. The system of claim 2, wherein the system memory includes instructions used by the processing device when executing at least one application.

13. The system of claim 2, wherein the system memory is run-time data generated by software executing on the processing device.

14. The system of claim 2, wherein the processing device is further configured to selectively determine priorities for portions of the system memory, and the priorities indicate an order for copying during a hibernation process.

15. The system of claim 1, wherein the processing device is a processor or a microcontroller.

16. The system of claim 1, wherein the volatile memory is embedded in the processing device.

17. The system of claim 1, wherein the non-volatile memory is embedded in the processing device.

18. The system of claim 1, wherein the first signal is received from a processing device of a host system.

19. A system comprising:
   at least one volatile memory;
   at least one non-volatile memory; and
   at least one processing device configured to:
      store data in the volatile memory;
      flag a portion of the data for hibernation;
      receive a first signal;
      in response to receiving the first signal, copy the flagged portion of the data from the volatile memory to the non-volatile memory; and
      after copying the flagged portion of the data, enter hibernation.

20. The system of claim 19, wherein the data is run-time data generated by software executing on the processing device.

21. A system comprising:
   at least one volatile memory;
   at least one non-volatile memory; and
   at least one processing device configured to:
      store system memory in the volatile memory; and
      copy a first portion of the system memory from the volatile memory to the non-volatile memory to enter hibernation.

22. The system of claim 21, wherein the processing device is further configured to determine priorities for copying portions of the system memory, the portions including the first portion having a higher priority than other portions, wherein the priorities indicate an order for copying during hibernation.

* * * * *